Figure 1:
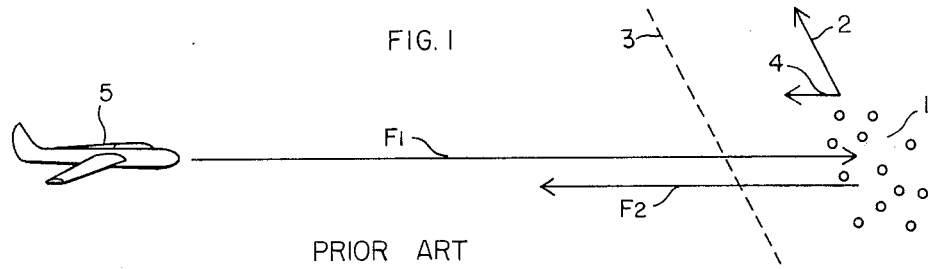

United States Patent [19]
McMillan

[11] 3,803,595
[45] Apr. 9, 1974

[54] SYSTEM OF DEVICES FOR POLLUTION DISCOVERY

[76] Inventor: Edward Bellamy McMillan, 45 Renwick Ave., Huntington, N.Y. 11743

[22] Filed: May 13, 1970

[21] Appl. No.: 36,961

[52] U.S. Cl............... 343/5 SA, 356/1, 356/4, 356/85
[51] Int. Cl............. G01s 9/00, G01j 3/28
[58] Field of Search ........ 356/4, 1, 75, 85; 343/5 SA, 18 B

[56] References Cited
UNITED STATES PATENTS

| | | | |
|---|---|---|---|
| 3,625,613 | 12/1971 | Abell et al. | 356/75 |
| 3,499,159 | 3/1970 | Carrier et al. | 356/4 UX |
| 3,327,124 | 6/1967 | Plum | 343/5 SA |
| 3,528,740 | 9/1970 | Gerry et al. | 356/75 X |
| 2,365,580 | 12/1944 | Murcek | 356/1 |

OTHER PUBLICATIONS

Airscheld et al., "New Fields for Laser Raman Spectroscopy", Proceedings of the Electro–Opt. Sys. Design Conf., Sept. 1969, pp. 418–427.
Weber, et al., "Jour. of the Optical Soc. of America", Jan. 1967, pp. 19–28.

Primary Examiner—Maynard R. Wilbur
Assistant Examiner—G. E. Montone
Attorney, Agent, or Firm—Mills and Coats

[57] ABSTRACT

A novel system of monochromatic devices for use within the Earth's atmosphere comprising an emission exciter and an emission detector for the discovery, identification and location of organic vapors of natural gasoline and fuel oil, other vapors, gases, liquids and solids, each disposed in free space along a boundary of other material. The exciter radiates such materials with electromagnetic waves at frequencies above at least one of the spaced electronic, vibrational and rotational frequencies characteristic of and identifying them. The radiation may be at a single frequency sweeping continuously through the portion of the frequency range which it is desired to examine, or alternatively at a plurality of spaced frequencies, each simultaneously sweeping a different portion of the range. The detector which may be disposed remotely from a material, resolves and measures the frequencies of the excited emission. Location of a material may be by triangulation, or alternatively by measurement of range and direction.

12 Claims, 6 Drawing Figures

PATENTED APR 9 1974  3,803,595

SHEET 1 OF 2

SYSTEM OF DEVICES FOR POLLUTION DISCOVERY

This invention relates to a novel system of emission excitation and detection devices for the discovery of emission sources which comprise pollution and other anomalies within the outer boundary of the atmosphere of the Earth. Such discovery is the object of my invention. I radiate monochromatic electromagnetic wave energy toward the suspected location of potential emitters. The molecules of matter such a the vapors, liquids and solids of waste, combustion processes, fuels, atmospheric disturbances and many other irregularities possess unique, distinct emission frequency spectra, any line of which can be excited by energy of frequency nearby in the same spectra but enough higher in frequency to allow for the energy dissipation of the excitation. Such matter discloses its presence by emitting when exposed to radiation, when I have selected a suitable frequency or alternatively have swept the spectrum, monochromatically any instant. With a sensitive receiver positioned and monochromatically tuned or filtered to locate and recognize the emission sources, I complete their discovery. Through being monochromatic my combination of devices concentrates enough energy to make discovery from a remote location feasible.

In the prior art fluorographic spectrometers are used to identify the emission frequencies of fluorescing gases. Employing polychromatic sources and detectors, each with an energy scattering grating, the distance must be very short between the gas under test, the exciter and the detector. Radiometers carried aloft by rockets or located beside an enormous antenna on the Earth's surface passively observe the radiation from gases in outer space. I wanted to be able to search from remote locations for pollution and other emission capable irregularities with equipment simpler and more feasible for everyday use. To persons skilled in the art, remote detection of such small concentrations of emitters seemed inconceivable. However, I discovered that I could assemble a novel simple system of component devices with which I was successful. Each component was conventional for some other purpose but not for mine. I improved upon the system of the spectrometer by eliminating the grating of at least one member of the exciter-detector combination, employing as that member a device adjustable monochromatically and providing optimum operation at any selected frequency. Such devices have become readily available for most sections of the spectrum.

My invention may be stated briefly as follows. It comprises a novel system of excitation and detection devices in combination with molecular sources in an anomaly for the discovery and location of the latter, when the latter is within the outer boundary of the Earth's atmosphere. At least one monochromatic exciter and one monochromatic receiver are disposed where there is a line of sight wave path, directly or by scattering, to an anomaly comprising a group of potentially excitable molecules. These may be near each other or mixed with other molecules as gases, vapors, dispersed liquids, solid particles and large solid bodies. On excitation of the anomaly by an electromagnetic wave radiated by the exciter, excitable molecules emit a wave at a lower frequency to the receiver. The emission frequency being inherent to the molecules, it is a clue to their identification. The receiver is sensitive only to this radiation but insensitive to reflections or other radiation at other frequencies. By moving either the exciter or the receiver, whichever is the more convenient, to other positions the anomaly is located by triangulation. Alternatively by pulsing the exciter and timing the arrival of the pulses at the receiver, and pointing a directional antenna, I am able to determine the location of the anomaly without changing positions.

Figure 2:
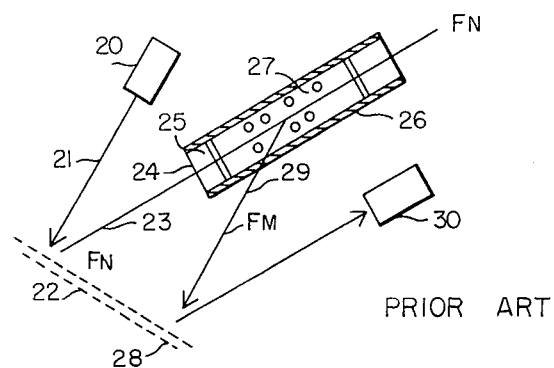
Figure 3:
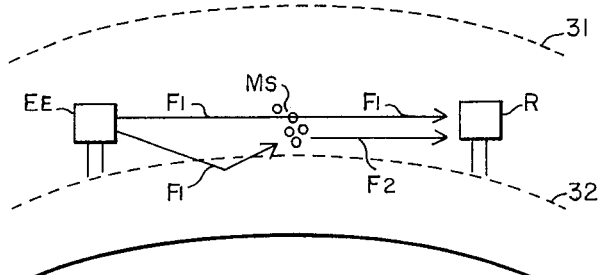
Figure 4:
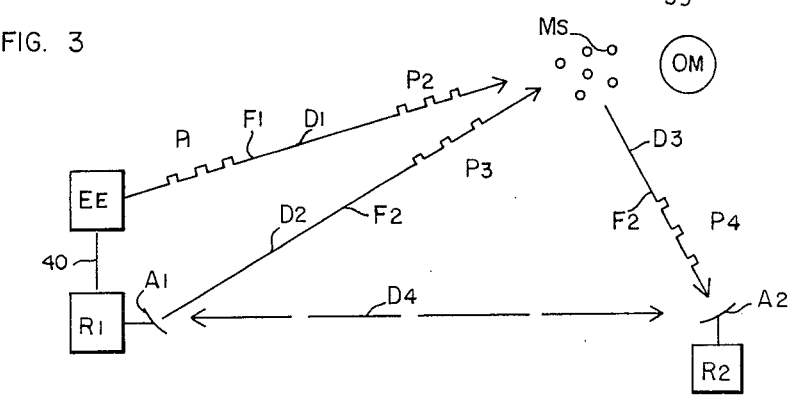
Figure 5:
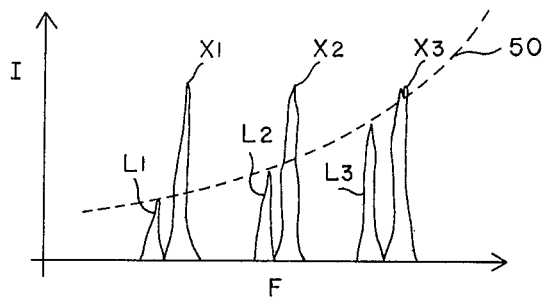
Figure 6:
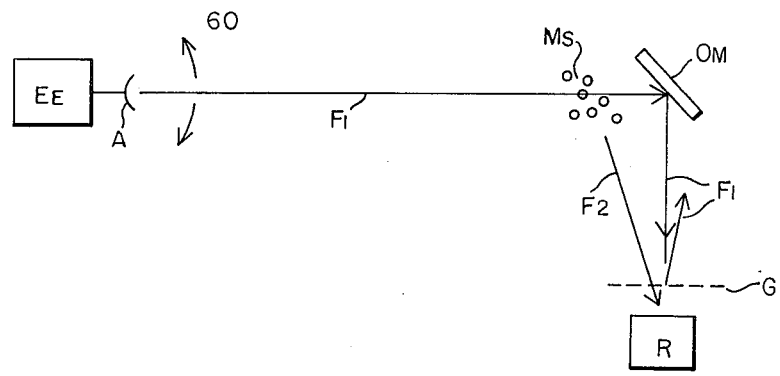

To assist in the understanding of my invention and its operation, I have provided the following figures. FIGS. 1, 2 and 5 describe some of the background of our system. FIGS. 3, 4 and 6 depict preferred embodiments. Such other embodiments are contemplated as are within the spirit and scope of the invention.

FIG. 1. — Microwave reflection and Doppler shift from a moving stream of hot air;

FIG. 2 — A fluorographic spectrometer;

FIG. 3 — Our combination of an exciter, molecular sources and a receiver;

FIG. 4 — A pulsed exciter in combination with molecular sources and a receiver having a directional antenna;

FIG. 5 — Excitation and emission lines;

FIG. 6 — An exciter with a directional antenna and a receiver with a grating.

In FIG. 1 an upstream 1 of hot air is moving diagonally upwards in the direction of arrow 2 to the right of air interface 3 and has a component of motion 4 horizontally to the left. A radar beam at frequency $f_1$ in a path from the aircraft 5 at the left crosses interface 3 and enters upstream 1 and there is a reflection 7 at frequency $f_2$ back to the aircraft. The horizontal component of motion 4 of the upstream and of the aircraft 5 introduces a doppler frequency shift with the result that $f_2$ is not equal to $f_1$. Since the radar system of aircraft 5 is tuned to frequency $f_1$ it is less sensitive to the reflection at frequency $f_2$. As a result, the upstream may not be discovered.

The microwave reflection characteristics of the moving stream of hot air may be described as follows. A component toward the source of the radar beam shifts the frequency of the reflected wave upwards, but a component away from the source shifts it downward. The apparent relative dielectric constant of a given species of hot air material is in proportion to its temperature, density and chemical content. The amplitude of the reflection is in proportion to this dielectric constant and if the stream is thin, to the thickness of the stream in the direction of the radar beam.

The emission characteristics of a material belongs to a different phenomena. It may be electronic, vibrational or rotational in nature. Emission of the hot air material will be energized by the radar beam only if the beam frequency is sufficiently close to an emission frequency inherent to one of the constituents of the air mixture. The emission frequency will always be lower than the excitation frequency because some excitation energy is dissipated in the frequency change. The state of the art of air stream location is such that advantage has not been taken of the opportunity to excite such streams in order to locate them by the contrast between their emission and that of the other air along their paths.

In FIG. 2, within the confines and short path lengths of a fluorographic spectrometer a continuously polychromatic source 20 radiates a broad spectrum of electromagnetic wave energy 21 against interference grating 22. An adjustable grating reflects a Fourier series of wave lengths 23 the frequency of any of which is $f_n$ into tube 24 and through the windows 25 and 26 of a test cell and through a charge 27 of gas contained between. Gas charge 27 having been excited by frequencies $f_n$, emits in all directions at frequency series $f_m$, the energy in the direction of adjustable grating 28 escaping through hole 29 in tube 24. Grating 28 is adjusted to reflect energy into detector 30. The amount of the adjustment numerically identifies the frequency series $f_m$. At both gratings 22 and 28 a great deal of beam energy is lost by dispersion. For the reasons that (1) the path lengths were short, (2) the cell had been evacuated of air, and (3) all emission energy radiated transversely had been reflected by the wall of the tube through hole 29, the intensity of frequency series $f_n$ is within the sensitivity range of detector 30. For paths in the Earth's atmosphere, especially much longer ones, the intensity of the two grating system is insufficient for detection.

In FIG. 3 the outer boundary of the Earth's atmosphere is line 31. The surface of the Earth, solid or alternately liquid, is line 32. At line 33 is a depth to which electromagnetic wave radiation may not reach if the frequency is too high. An excitation exciter EE placed on surface 32 is shown radiating such a wave $f_1$ through a group of molecular emission sources MS, reaching them directly and by scattering from a lower level. The sources MS having been excited by wave $f_1$ are emitting at a lower frequency $f_2$. The radiation in the direction of receiver R is detected by R at the frequency at which it is sensitive, in this case $f_2$. By tuning, or alternatively by filtering, R rejects radiation of frequency $f_1$.

If both the exciter EE and the receiver R were simply filtered too much radiation would be lost for adequate detection. Because at least one of the combination EE-R is monochromatically tuned for maximum output or sensitivity as the case may be, the molecular emission wave $f_2$ is detected even though the distances are considerable.

In FIG. 4 an excitation exciter EE radiates a wave at frequency $f_1$ over distance $d_1$ to a concentration of polar molecules MS along the boundary of other material OM. This has excited the molecules to emit radiation in all directions at a lower frequency $f_2$. Receiver $R_1$ with directional antenna $A_1$ located at a distance $d_2$ from MS has been oriented for maximum detection and thus points to MS. Receiver $R_2$ with antenna $A_2$ located at distance $d_3$ similarly points to MS. Since the distance $d_4$ between the receivers is known, the molecular sources which may be a pollution have been located by triangulation as well as discovered.

To obtain greater excitation energy at any instant in MS the radiation of EE may be pulsed, the pulses being shown as $p_1$ and $p_2$. The emission of MS though at a different and lower frequency, determined by the molecular structure of MS, is coherently pulsed by EE, as shown at $p_3$ and $p_4$.

Alternative to location of MS by knowledge of distance $d_4$, it may also be determined by interconnecting EE and $R_1$ with a timing circuit 40 so that EE and $R_1$ in combination may completely locate MS through the knowledge of the elapsed time of travel from EE to MS plus the elapsed time of travel from MS to $R_1$ together with the pointing orientation of antenna $A_1$.

It can be readily visualized that the molecular sources MS might be organic vapors rising above fuel oil floating at sea. The other material OM would be the oil and outer layers under the vapors. Molecular sources distributed along "solid" ground might be natural gasoline within the porous electromagnetic wave penetrable surface as well as gasoline vapors rising from it in the atmosphere.

In FIG. (5) I is the vertical intensity coordinate and $f$ the horizontal frequency coordinate of a rectangular graph of excitation X — emission 1 intensity at a series of frequencies determined by the molecular structure of an emission source of our invention. Thus there are emission lines $1_1$, $1_2$, $1_3$, etc. at successively higher frequencies. These are paired with corresponding excitation lines $X_1$, $X_2$, $X_3$, etc. The former may increase in intensity with frequency as shown by line 50/.

To search for molecular sources which may be of interest in pollution discovery or for other purposes, we provide the alternatives of (1) sweeping the frequency range continuously with our exciter or (2) radiating at spaced frequencies located as for $X_1$, $X_2$, $X_3$, etc. The latter alternative is feasible when the excitation-emission characteristics of the molecular sources are known in advance. It is also feasible when we sweep the search spectrum repeatedly with many series of spaced frequencies, each series incrementally different in frequency, until an emission response from the molecular sources is detected.

Either the emission exciter or the receiver may be internally continuously polychromatic but monochromatically filtered near its aperture into the atmosphere. The other must be monochromatically tuned internally for maximum output or sensitivity, respectively, at a single frequency or an intermittent series of frequencies.

In FIG. 6 the antenna A of the excitation exciter EE as shown by double arrow 60 has scanned a beam of frequency $f_1$, in azimuth. Molecular sources MS along a boundary of other matter OM were in its path. These sources in turn emitted at frequency $f_2$ and were detected by receiver R. A grating G rejected excitation energy reflected from other matter OM. The direction to the sources was discovered. The location of the sources was then fixed by moving exciter EE to other positions.

The foregoing embodiments are intended to be representative only. Reference should be make to the following claims in determining the scope of the invention:

What I claim is:

1. A system of excitation and detection devices for the discovery of molecular emission sources comprising a monochromatic emission exciter and at least one monochromatic receiver in combination with molecular sources derived from petroleum distributed at the Earth's surface in proximity to each other,, a monochromatic electromagnetic wave of the portion of the spectrum embracing the electronic, vibrational and rotational regions emitted by said sources along a wavepath relatively unconfined over a substantial portion of the distance to said receiver; said exciter radiating energy comprising an electromagnetic wave travelling in said atmosphere in a wavepath originating in said emission exciter at a higher frequency than said wave emitted by said sources, impinging upon and exciting said sources, said wave emission by said sources being monochromatic at a frequency determined principally by the molecular structure of said sources; said receiver identifying and measuring said frequency, at least one of said devices being remotely located from said molecular sources and said receiver being insensitive to the reflection of said excitation wave from said Earth's surface and from said molecular sources.

2. The system of claim 1 in which the energy of said exciting wave and said emission wave is substantially confined in pulses.

3. The system of claim 2 in which the sum of the travel time of said exciting wave to said molecular sources and the travel time of said emission wave to said receiver is measured, providing the total distance along the path from said exciter to said sources and from said sources to said receiver.

4. The system of claim 1 comprising a combination of an exciter and a receiver, at least one of which has a directional antenna pointed at the molecular sources.

5. The system of claim 4 disposed to provide an electromagnetic wave in a generally tangentially wavepath co-directional to the Earth's surface, at least one group of molecular emission sources in said wavepath, at least one additional wavepath to said receiver and a wave emitted by said sources travelling to said receiver, said receiver being sensitive to said wave.

6. The system of claim 5 in which the Earth's surface is liquid.

7. The system of claim 5 in which the Earth's surface is solid.

8. The system of claim 5 disposed in successive relative positions with respect to said molecular sources so that the location of said sources is determinable geometrically by triangulation.

9. The system of claim 1 comprising a combination of said emission exciter and said receiver, in which the radiation of said exciter is adjustable to the frequencies at which said emission sources can be excited and the sensitivity of said receiver is adjustable to the inherent emission frequencies of said sources.

10. The system of claim 9 in which at least one member is monochromatic by tuning over a substantially continuous frequency spectrum, the other being monochromatic by adjustable filtering over a continuous frequency spectrum.

11. The system of claim 9 in which both members are monochromatic by tuning over a substantially continuous frequency spectrum.

12. The system of claim 9 in which at least one member is monochromatic by adjustment at each of a series of spaced frequencies.

* * * * *